Figure 1:
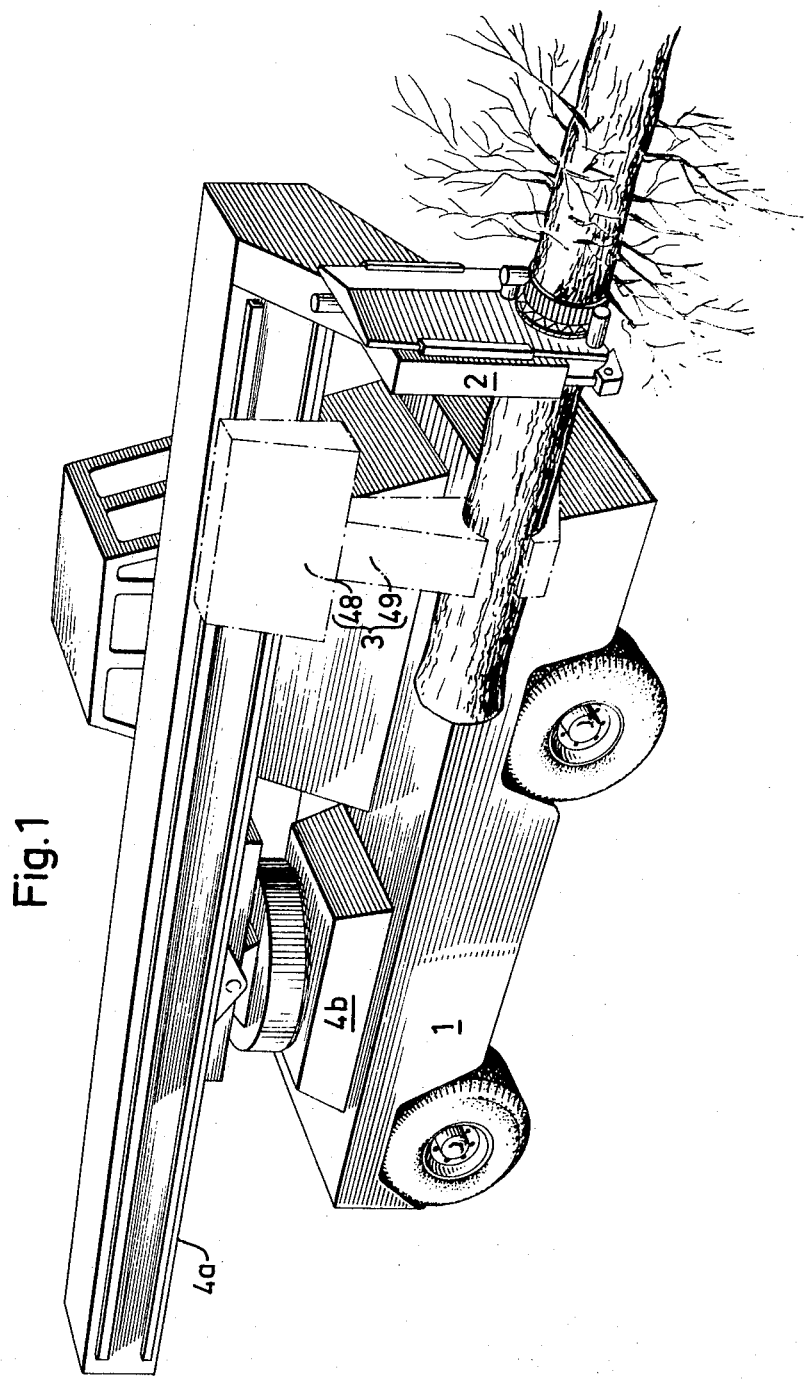

United States Patent
Erikksson et al.

[15] 3,659,636
[45] May 2, 1972

[54] METHOD AND APPARATUS FOR GRIPPING AND DEBRANCHING FELLED TREES

[72] Inventors: Erik Helmer Erikksson, Söderhamn; Olof Edvin Frisk, Ornskoldsvik; Lars-Gunnar Högberg, Ornskoldsvik; Stig-Gunnar Löfgren, Ornskoldsvik; Sven Paul Järnstrom, Jarved, all of Sweden

[73] Assignee: Mo Och Domsjo Aktiebolag, Ornskoldsvik, Sweden

[22] Filed: Oct. 8, 1969

[21] Appl. No.: 864,712

[30] Foreign Application Priority Data

Oct. 11, 1968 Sweden..................13777/68

[52] U.S. Cl..........................................144/2 Z
[51] Int. Cl............................................A01g 23/02
[58] Field of Search............144/2 Z, 3 D, 34 R, 34 E, 309 AC

[56] References Cited

UNITED STATES PATENTS

| | | | |
|---|---|---|---|
| 3,252,487 | 5/1966 | Larson et al. | 144/2 Z |
| 3,269,437 | 8/1966 | Busch | 144/2 Z |
| 3,443,611 | 5/1969 | Jorgensen | 144/2 Z |
| 2,989,097 | 6/1961 | Bombardier | 144/2 Z |
| 3,348,592 | 10/1967 | Winblad et al. | 144/2 Z |
| 3,542,099 | 11/1970 | Gibson | 144/3 D |
| 3,556,180 | 1/1971 | Jones | 144/2 Z |

Primary Examiner—Gerald A. Dost
Attorney—Janes & Chapman

[57] ABSTRACT

A method is provided for gripping and debranching felled trees, in which the tree is gripped by a gripping member and lifted thereby from the surface of the ground to a higher plane, in which it is moved in its longitudinal direction through or beyond a debranching means, the gripping member and the debranching member being brought simultaneously into contact with the felled tree in the plane of the ground, and the branches and knots of the tree are then severed from the tree trunk by the debranching member.

An apparatus is provided including a frame structure for horizontal and vertical movement on a support structure, a feed means capable of being moved along the frame and a gripping member and a debranching member which are securely attached to the frame. The debranching member comprises an upper and a lower tool, which are separated from each other, and comprise an elongated chain of members provided with cutting edges, and are pivotally connected to each other and with respect to the longitudinal extension of the tool. The members are rotatable in relation to each other between a position in which the tool is substantially straight and a second position in which the tool is curved at a certain radius, and form a continuous edge facing the conveying direction, irrespective of their mutual position.

15 Claims, 6 Drawing Figures

Patented May 2, 1972

3,659,636

4 Sheets-Sheet 1

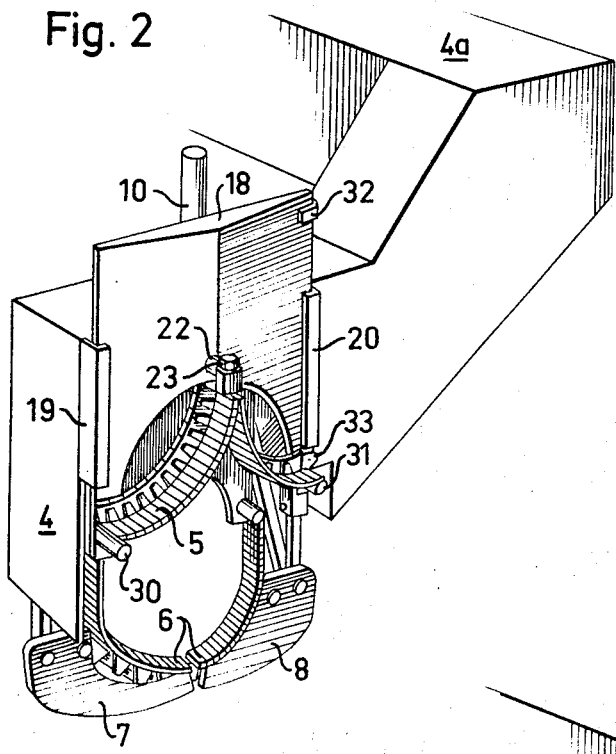
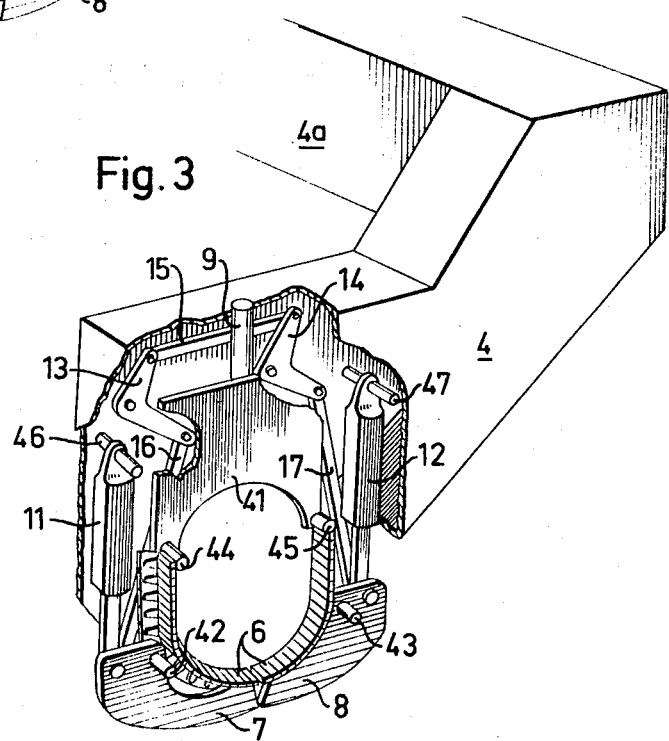

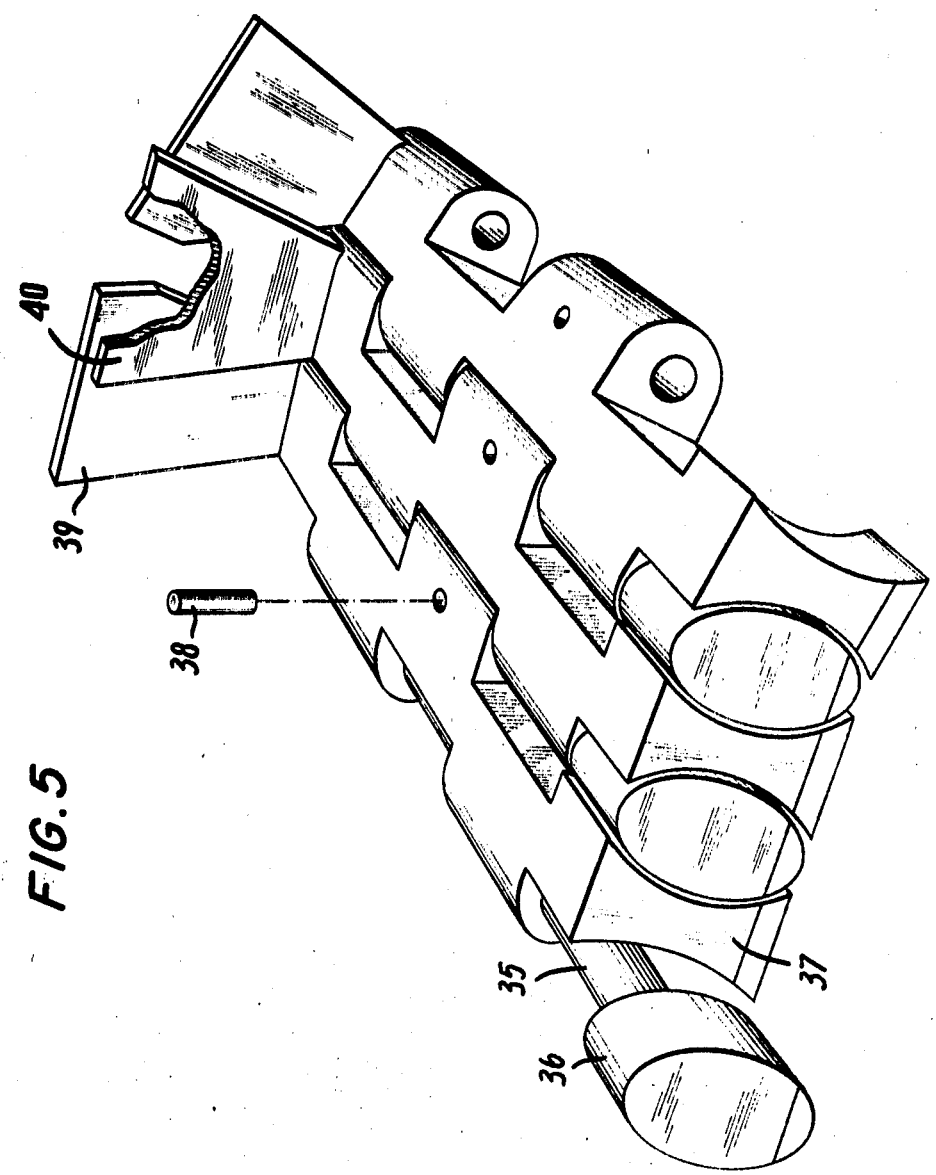

METHOD AND APPARATUS FOR GRIPPING AND DEBRANCHING FELLED TREES

The present invention relates to a method and an apparatus for gripping and debranching felled trees.

There a number of different methods known to the art by which felled trees can be gripped and debranched. These methods usually entail grasping the tree at one end, normally at the root end of the trunk, and moving the tree, either vertically or horizontally, to a debranching station, which is situated remote from the felling station, where the tree is accurately positioned in relation to the direction in which it is to be fed through the debranching machine. A serious disadvantage associated with these known methods, however, is that a considerable length of time, during which no debranching can take place, is taken to move the tree from the place where it is picked up to the debranching station and to align the tree with regard to its feed direction through the machine. Known apparatus based on this principle of operation are consequently provided with separate means for gripping and debranching the trees, which renders them unnecessarily complicated. These means are normally arranged at one end of a beam, along which the tree is fed longitudinally during the debranching operation. To these ends, the beam is normally arranged for movement horizontally and vertically on a support structure which is often carried by a wheeled or track-driven vehicle. In known apparatus the debranching means is in the form of an elongated web or chain like structure of interlinked blades which encircle the trunk of the tree during the debranching operation. The disadvantage of such debranching chains, however, is that they do not form a completely continuous edge around the tree, thereby allowing branches and knots to pass between the blades without being severed thereby. This disadvantage is particularly manifest when debranching trees of relatively small diameter, with which the debranching chain is wrapped around the treetrunk at a reduced radius whereby the distance between the blades increases to a corresponding degree. These arrangements are therefore considered unsuitable for debranching normally occurring small wood and, when used to debranch wood of a more robust nature, perform work which is so incomplete that the trunk must be manually trimmed afterwards. Another disadvantage associated with these known apparatus is that the separate gripping and debranching means require separate drive sources or that separate transmissions be connected to the same drive source. This renders the apparatus much more complicated and expensive and causes the amount of power required to be unnecessarily high. Another disadvantage with the use of a single, continuous chain of knives as a debranching means is that appreciable force must be applied to stretch the chain if it is to lie properly against the surface of the trunk. In turn this results in a high degree of friction between the debranching chain and the wood, and the power consumed and the wear on the blades of the chain is unreasonably high.

One object of the invention is therefore to eliminate these disadvantages. Accordingly, the invention relates to a method for gripping and debranching felled trees, in which the tree is gripped by a gripping means and lifted thereby from the surface of the ground to a higher plane in which it is moved in its longitudinal direction through or beyond a debranching means, the branches and knots on the tree being removed from the trunk thereof by the debranching means, The method of the invention is characterized in that the gripping means and the debranching means are brought into contact with the felled tree lying in the plane of the ground simultaneously.

The invention is also concerned with an apparatus for carrying out the method, said apparatus including a frame mounted for horizontal and vertical movement on a foundation structure, a feed means capable of being moved along the frame, and a gripping means and a debranching means securely attached to the frame, the apparatus being characterized in that the debranching means comprises an upper and a lower tool arranged in mutual spaced relationship and each of which is in the form of an elongated chain of members provided with cutting edges and wherein each alternate one of said members has the form of a circle, ellipse or biconvex lens while the members therebetween have the shape of a biconcave lens, when viewed in the feed direction, said members being pivotally connected together and, with regard to the lateral extension of the tool, are capable of rotating in relation to each other between a first position in which the tool is essentially straight and a second position in which the tool is curved at a certain radius, the cutting members being so arranged in relation to each other that they form a continuous edge facing the feed direction irrespective of the mutual position in which they are located, and the lower tool forms an integral part with and comprises a part of the gripping member.

Because the gripping member is integral with the debranching member and forms a part thereof the relatively long period of time, viewed in relation to the total debranching time, used with heretofore known apparatus for transporting the tree from the ground to the debranching station and aligning the tree with regard to its feed direction through the apparatus is eliminated.

Another advantage associated with the fact that the gripping member forms an integral part of the debranching member is that the gripping member and the debranching chain formed integral therewith are connected to the same power source. The apparatus is in this way greatly simplified, while at the same time the power required to transport the tree to the feed station is much less than with machines known heretofore. Another considerable advantage with the apparatus of the present invention is that the debranching member comprises two separated chains of debranching knives. These chains are arranged so that during the debranching operation they each encircle the trunk of the tree through only half of a circle and so that they overlap each other when seen in the feed direction. In this way the friction between the debranching member and the tree trunk during the debranching operation is much less than with hitherto known apparatus, in which the debranching member comprises a single, continuous chain of debranching blades which completely encircle the trunk. Another important advantage to be gained with the apparatus of the present invention is that the members provided with cutting edges form, as a result of their special configuration, a continuous edge facing the feed direction. Thus, the branches and knots present on the tree are prevented from passing the debranching member without being severed thereby. This is also true when the debranching chains are curved with a very small radius, i.e., when debranching so-called supple wood.

Figure 4:
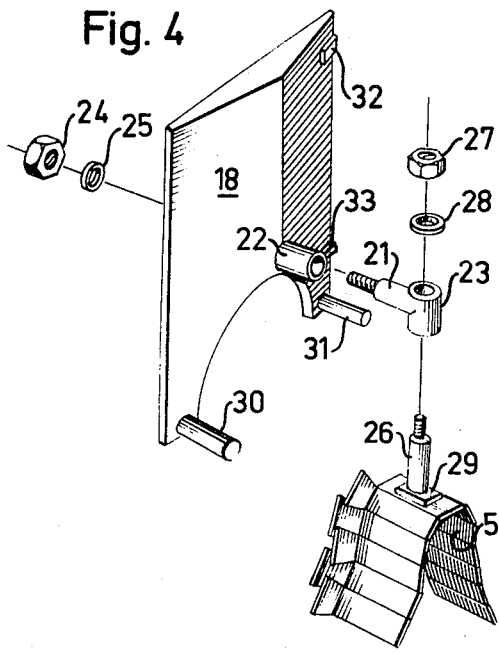
Figure 6:
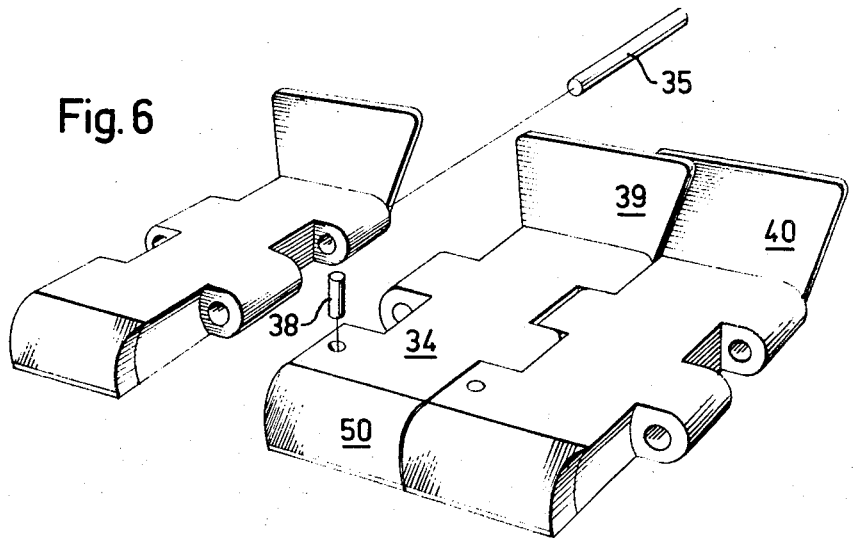

The invention will now be described with reference to a number of embodiments thereof illustrated in the accompanying drawings, in which FIG. 1 illustrates a vehicle provided with one embodiment of the gripping and debranching means of the invention and an apparatus for feeding the felled trees through said gripping and debranching means, FIG. 2 is a view of the gripping and debranching means seen from the infeed end, having an upper and a lower debranching tool, FIG. 3 shows the gripping and debranching means partly cut away and with the upper debranching tool removed, FIG. 4 is an exploded view of the attachment means of the upper debranching tool, FIG. 5 shows one element of the debranching tools, FIG. 6 shows a modification of the element illustrated in FIG. 5.

In FIG. 1 there is shown a vehicle 1 on which is arranged a gripping and debranching means 2 and a feed means 3. The gripping and debranching means comprises a box-like bracket structure 4 (see FIGS. 2 and 3) secured to the vehicle and supporting an upper and a lower chain-like debranching tool 5 and 6 and two slightly curved gripping claws 7, 8. The lower debranching tool 6 is divided into two identical parts. The bracket structure 4 is attached to a frame 4a which in turn is movably arranged on a support structure 4b securely mount to the vehicle and adapted so that it can be pivoted both horizontally and vertically by hydraulic cylinders (not shown in the drawing). Mounted on the bracket structure 4 are also the hydraulic cylinders 9, 10 and 11, 12 respectively intended for operating the debranching tools and the gripping claws, and a link system 13–17 for synchronizing the movements of said claws. On the front side of the bracket structure is an attachment plate 18 which is mounted for movement in two vertically extending guides 19, 20 in said bracket. A shaft pin 21, which is threaded at one end, is pivotally mounted in a horizontally extending sleeve 22 (see FIG. 4) securely attached to the attachment plate 18. At its unthreaded end the shaft pin carries a sleeve 23 and is secured thereto as by welding. The shaft pin 21 is retained in the sleeve 22 by means of a nut 24 and a washer 25. A shaft pin 26, also threaded at one end, is pivotally mounted in the sleeve 23 and supported thereby with the aid of a nut 27 and a washer 28. An attachment 29 is securely mounted at the unthreaded end of the shaft pin 26. The attachment plate 18 is provided at its lower end with two horizontal pins 30, 31 on which the upper debranching tool 5 is secured at its ends. The debranching tool 5 is securely attached to its center portion to the attachment 29. The cylinder of the hydraulic cylinder 10 is securely attached to the bracket member 4, while the piston rod is connected to the attachment plate 18. On the attachment plate there are located two abutments 32 and 33, which restrict the vertical movement of the plate. The debranching tools 5, 6 each comprise a number of links 34, which are held together by pins 35, cutting members 36, 37 (See FIG. 5) being securely attached to said links and pins. The pins are inserted in two adjacent links, which engage in each other. A knurled or serrated pin 38 is inserted in a hole 38' in respective links 34 and in a hole 38'' in corresponding link pins, 35 so that when the tool is assembled the contours of these members coincide with each other and form a forwardly directed continuous edge irrespective of how the links are turned in relation to each other. This is a great advantage since the continuous edge during the debranching operation will consequently follow exactly the contours of the trunk and prevent branches or knots from passing the tool without being severed thereby. At the ends remote from the cutting members the links are provided with plates 39, 40, which extend in a plane at right angles to the links and overlap each other thereby preventing severed branches and knots from accompanying the tree in the feed direction. One of the plates is shown slightly cut away in the figures.

In the box-like bracket structure 4 there is provided an attachment plate 41 which is mounted for movement in two vertical guide structures (not shown) in the same way as the attachment plate 18. At their lower portion the bracket structure and the attachment plate 41 are each provided with two horizontally extending shaft pins 42–43 and 44, 45 respectively. The gripping claws 7, 8 are pivotally mounted on the shaft pins 42, 43, while the two portions of the lower debranching tool 6 at the one end thereof are securely attached to the shaft pins 44, 45 and at the other end on the gripping end of each gripping claw. The cylinder of the hydraulic cylinder 9 is securely attached to the bracket member 4 and the piston rod is connected to the attachment plate 41.

The two gripping claws are pivotally connected at the portion thereof remote from the gripping end to the piston rods of the hydraulic cylinders 11, 12 which in turn are pivotally journalled at the upper portion of the cylinder on studs 46, 47 securely mounted to the bracket member 4. The link system intended for synchronizing the movement of the gripping claws comprises two angular levers 13, 14 which are pivotally connected together by means of a link 15 and to the gripping claw by means of two rods 16, 17.

The feed means 3 comprises a sledge or carriage 48, which can be moved along the frame 4a by means of a hydraulic motor (not shown) and is provided with means 49 for retaining the tree during the feeding sequence. The feed means and its retaining means are indicated by phantom lines in FIG. 1.

In FIG. 6 there is illustrated an alternative embodiment of the cutting members illustrated in FIG. 5 In this embodiment of the cutting members, instead of said members being alternately in the shape of a circle, ellipse or biconvex lens and the shape of a biconcave lens when seen in the feed direction of the tree, they all have the shape of a concave-convex lens when seen in said direction. This facilitates the manufacture and assembly of the cutting tools and may be preferred on some occasions. Similarly to the cutting members shown in FIG. 5, the cutting members of the alternative embodiment form a continuous edge facing the transport direction, irrespective of the position in which the edges are located. The exemplary embodiment of FIG. 6 includes three links, of which one for the purpose of illustration is shown isolated from the remainder. The links are pivotally interconnected by means of link pins 35 which are inserted in two adjacent interengaging links. A cutting tool 50 is securely attached to each link 34. Each cutting bit has the shape of a concave-convex lens, the main axis corresponding to the lens shape lying parallel with the edge of the cutting bit. A knurled or serrated pin 38 is inserted in a hole 38' in respective links 34 and a hole 38'' in corresponding pin 35, so that when the debranching chain is assembled the cutting bits with regard to the contours thereof coincide with each other and form a continuous edge irrespective of how the links 34 are rotated in relation to each other, similarly to the embodiment illustrated in FIG. 5. Since all cutting bits are identical and are only mounted to the links the manufacture and assembly of said members is greatly facilitated.

Although the above exemplified links are provided with special cutting bits it is, of course, possible to embody the cutting bits directly onto the links. The work of manufacture and assembly is, of course, greatly simplified in this way.

The tree is debranched in the following manner. Subsequent to felling the tree the vehicle and/or frame 4a are manoeuvered to such a position that the longitudinal direction of the frame lies approximately parallel with the center axis of the tree and so that the tree is located with its root end facing the vehicle. The vehicle is moved towards the tree until the tree is beneath the gripping and debranching means and with the root end so far behind the same (to the left of the gripping and debranching means illustrated in FIG. 1) that the first branches are located immediately in front of the upper debranching tool of the apparatus. Oil is then passed to the respective hydraulic cylinders 10–12 of the attachment plate 18 and the gripping claws, simultaneously as the hydraulic cylinder 9 of the attachment plate 41 is connected with an expansion vessel associated with the hydraulic cylinders for surplus oil (not shown in the Figures). The attachment plate 18 with the debranching tool 5 adopts its upper end position and the attachment plate 41 with the debranching tool 6 adopts its lower end position while the grip claws open so that the two parts of the debranching tool 6 are separated and directed substantially straight downwards from the attachment plate 41. When the feed means 3 is located adjacent the gripping and debranching means it is moved rearwardly by means of the hydraulic cylinder intended for the purpose towards the center of the frame 4a. The frame 4a is turned in the vertical plane until the gripping and debranching means rest with the upper debranching tool 5 against the trunk of the tree. Oil is passed to the hydraulic cylinders 11, 12 of the claws, so that the gripping claws are closed on the lower side of the trunk, whereafter the frame 4a is rotated back to horizontal position. The root end of the tree is lifted in this manner from the ground by the gripping claws brought together beneath the trunk. The feed means 3 is moved by means of its hydraulic motor towards its forward end position, whereafter the bowl end of the tree is clamped to the feed means by means of the retaining member 49. Oil is passed to the hydraulic cylinder 9 of the attachment plate 41 while the hydraulic cylinder 10 of the attachment plate 18 is connected with the expansion vessel. The debranching tool 6 is, in this manner, drawn upwards by the cylinder 9 and the debranching tool 5 downwards by the heavy attachment plate 18. Subsequent to the tree being thus retained by the retaining means 49 of the feed means and encircled by the two debranching tools 5, 6 the feed means is moved rearwards. The tree trunk is in this manner pulled by the carriage through the gripping and debranching means, the branches and knots on the tree being urged against the debranching tools and severed from the trunk thereby. Subsequent to the whole of the tree being passed through the gripping and debranching means and freed from all branches and knots, the top end of the tree falls under its own power from the gripping and debranching means down onto the ground, whereafter the retaining member 49 is caused to release the tree so that its bowl end also falls to the ground.

Although the apparatus of the invention has been described with reference to a number of embodiments thereof it should be understood that these embodiments are not restrictive of the concept of the invention. For example, the cutting bits 36 may have a biconvex shape or a circular shape when seen in the feed direction. Neither it is necessary that the means for suspending the debranching tools 5, 6 are those shown in the embodiment. For example, the shaft pins 30, 31, 44 and 45 by which the debranching tools are secured can well be changed for rotatable rollers which are connected to a suitable power source, so that the debranching tool can be rolled on the rollers when stretched. When employing this alternative it is not necessary that the attachment plate 41 of the debranching tool be movably arranged, but can be securely attached to the bracket member 4.

The power sources of the gripping claws and debranching tools can also be varied within the scope of the inventive idea and may comprise, for example, electrical or pneumatic motors. The construction using hydraulic cylinders, however, has been found most suitable in this connection.

We claim:

1. An apparatus for gripping and debranching felled trees comprising, in combination, a frame structure mounted for horizontal and vertical movement on a support structure; a feed means including a tree-retaining member and movable horizontally along the frame; and a gripping and debranching member fixed in a stationary position to the frame, and comprising a flexible array of separate and space cutting members linked together and arranged in two groups to embrace the tree from opposite sides, each member having a cutting edge and the cutting edges of each member with the cutting edge of adjacent members on each side thereof collectively forming a substantially continuous cutting edge closely conforming to the circumference of the tree at all times when the array embraces the tree and facing the tree feed direction, such that branches and knots cannot pass the members without being cut thereby, the felled tree being held by the retaining member and drawn past the gripping and delimbing member to debranch the tree.

2. An apparatus according to claim 1, in which the separate and spaced cutting members each comprise an elongated chain of members provided with cutting edges and pivotally connected to each other.

3. An apparatus according to claim 2, in which each chain embraces half the circumference of the tree.

4. An apparatus according to claim 1, in which each of the chains comprises pairs of members pivotally connected to each other by links and comprising two knives rigidly connected to each other, the members being arranged with the cutting edges of the knives turned in the same direction.

5. An apparatus for gripping and debranching felled trees comprising a frame structure mounted for horizontal and vertical movement on a support structure; a feed means including a tree-retaining member and movable horizontally along the frame, and a gripping and debranching member comprising at least two separate and spaced flexible arrays of cutting tools linked together and arranged to embrace the tree from opposite sides, each cutting tool having a cutting edge and the cutting edge of each tool with the cutting edge of adjacent tools on each side thereof collectively forming a substantially continuous cutting edge closely conforming to the circumference of the tree at all times when the array embraces the tree, and facing the tree feed direction, such that branches and knots cannot pass the tools without being cut thereby, the cutting tools comprising an elongated chain of tools pivotally connected to each other, and rotatable between a first position in which the array is substantially straight and a second position in which the array is curved.

6. An apparatus according to claim 5, in which one tool is integral with the gripping and debranching member, and comprising two portions securely attached at one end to the frame on opposite sides of the tree, and attached at the other end to corresponding gripping claws.

7. The apparatus of claim 5, in which of alternate members of the elongated chain of members provided with cutting edges, one has the form of a circle, ellipse or biconvex lens and the next one has the shape of a biconcave lens, when seen in the tree feed direction.

8. The apparatus of claim 5 in which substantially all of the members of the chain of members provided with cutting edges have the shape of a concave-convex lens, the main axis corresponding to the lens being parallel with the cutting edge.

9. The apparatus of claim 5, in which the chain of members provided with cutting edges comprises separate cutting units attached to each link.

10. The apparatus of claim 5, in which the chain of members provided with cutting edges comprises links of which a portion presents a cutting edge.

11. The apparatus of claim 5, comprising an attachment plate which is arranged for vertical movement on a bracket structure securely mounted to the frame across the feed path of the tree, and to which attachment plate the upper tool is secured so that its ends are located on either side of the feed path, when seen in the horizontal plane.

12. The apparatus of claim 11, in which the gripping member and the attachment plate are each connected to a separate source of power, with which they can be operated and move.

13. The apparatus of claim 5, in which one of the tools is divided laterally into two portions of substantially equal length, which portions are securely attached at one end to the bracket structure on either side of the feed path of the tree and at the other end to corresponding gripping claws.

14. The apparatus of claim 5, in which the elongated chains of members are each adapted to encircle a half of the circumference of the tree.

15. An apparatus according to claim 5, in which the feed means is movable along a track attached to the frame support.

* * * * *

G16-125

PO-1050
(5/69)

UNITED STATES PATENT OFFICE
CERTIFICATE OF CORRECTION

Patent No. 3,659,636　　　　　　　　Dated May 2, 1972

Inventor(s) Eriksson et al.

It is certified that error appears in the above-identified patent and that said Letters Patent are hereby corrected as shown below:

| | | |
|---|---|---|
| Title Page [45] | : | "Erikksson" should be -- Eriksson -- |
| Title Page [72] | : | "Erikksson" should be -- Eriksson -- |
| Title Page [72] | : | "Järnstrom" should be -- Tjärnström -- |
| Title Page [30] | : | Insert second Swedish priority date: -- Aug. 19, 1969　　11513/69 -- |
| Column 3, line 23 | : | "to" (first occurrence) should be -- at -- |
| Column 3, line 35 | : | Delete comma (,) before "35" and insert comma (,) after "35" |

Signed and sealed this 24th day of April 1973.

(SEAL)
Attest:

EDWARD M. FLETCHER, JR.　　　　　　　ROBERT GOTTSCHALK
Attesting Officer　　　　　　　　　　　Commissioner of Patents